United States Patent [19]

Weis

[11] Patent Number: 4,529,833
[45] Date of Patent: Jul. 16, 1985

[54] FLOOR DISTRIBUTION BOX

[75] Inventor: Franz Weis, Laval, Canada

[73] Assignee: Metofer Inc., South Orange, N.J.

[21] Appl. No.: 560,213

[22] Filed: Dec. 12, 1983

[51] Int. Cl.³ .............................................. H02G 3/28
[52] U.S. Cl. ......................................... 174/48; 52/221
[58] Field of Search ....................... 174/48, 49; 52/221

[56] References Cited

U.S. PATENT DOCUMENTS

| | | | |
|---|---|---|---|
| 3,932,696 | 1/1976 | Fork et al. | 174/48 |
| 4,010,314 | 3/1977 | Kohaut | 174/48 |
| 4,178,469 | 12/1979 | Fork | 174/48 |
| 4,335,269 | 6/1982 | Haskins | 174/48 |
| 4,408,090 | 10/1983 | Kohaut | 174/48 |

*Primary Examiner*—A. T. Grimley
*Assistant Examiner*—D. A. Tone

*Attorney, Agent, or Firm*—Burns, Doane, Swecker & Mathis

[57] ABSTRACT

A floor distribution box adapted for securement in a channelway defined between opposed cells of a corrugated floor structure wherein the channelway has a bottom wall and opposed outwardly inclined side walls having opposed aligned access openings therein. The floor distribution box comprises opposed transverse walls, a top wall having an outlet opening, a bottom wall, and outwardly biased displaceable end walls secured for inward pivotal displacement. An access opening is provided in each of the end walls and is provided with engagement members in the perimeter thereof for engagement in a respective one of the opposed access openings of a channelway. The outward bias provides a snap-fit engagement of the engagement members in the aligned access openings for retention of the box across the channelway.

25 Claims, 7 Drawing Figures

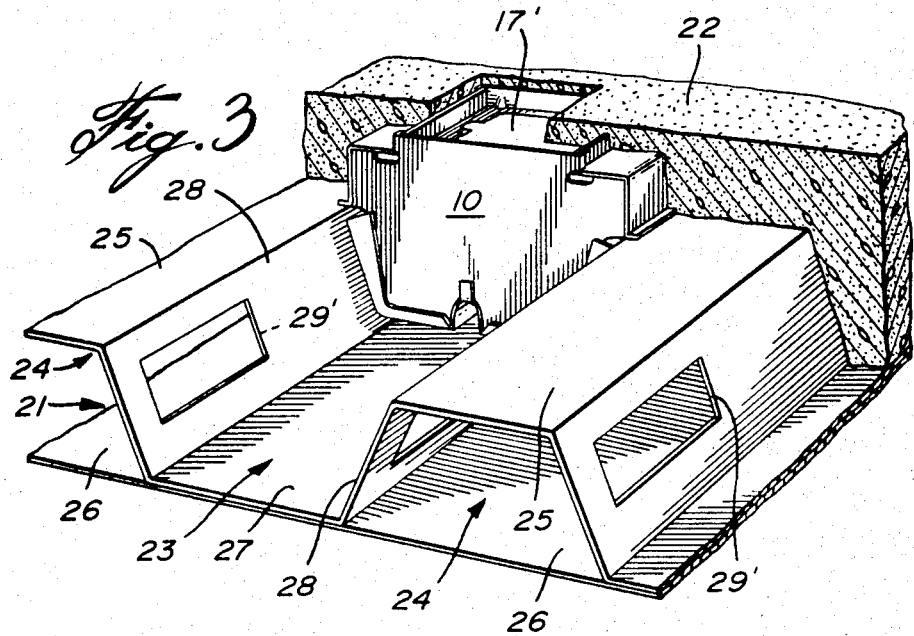
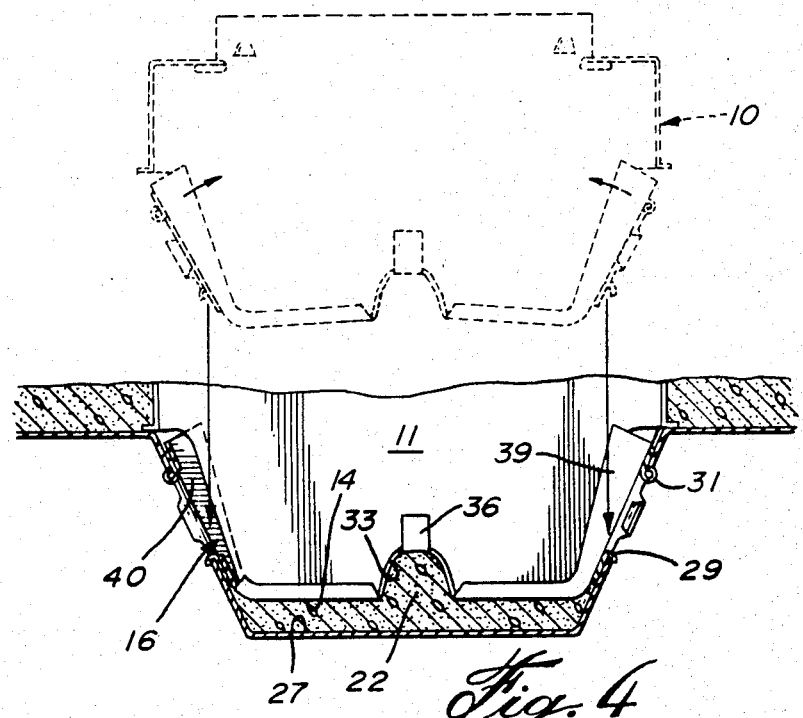

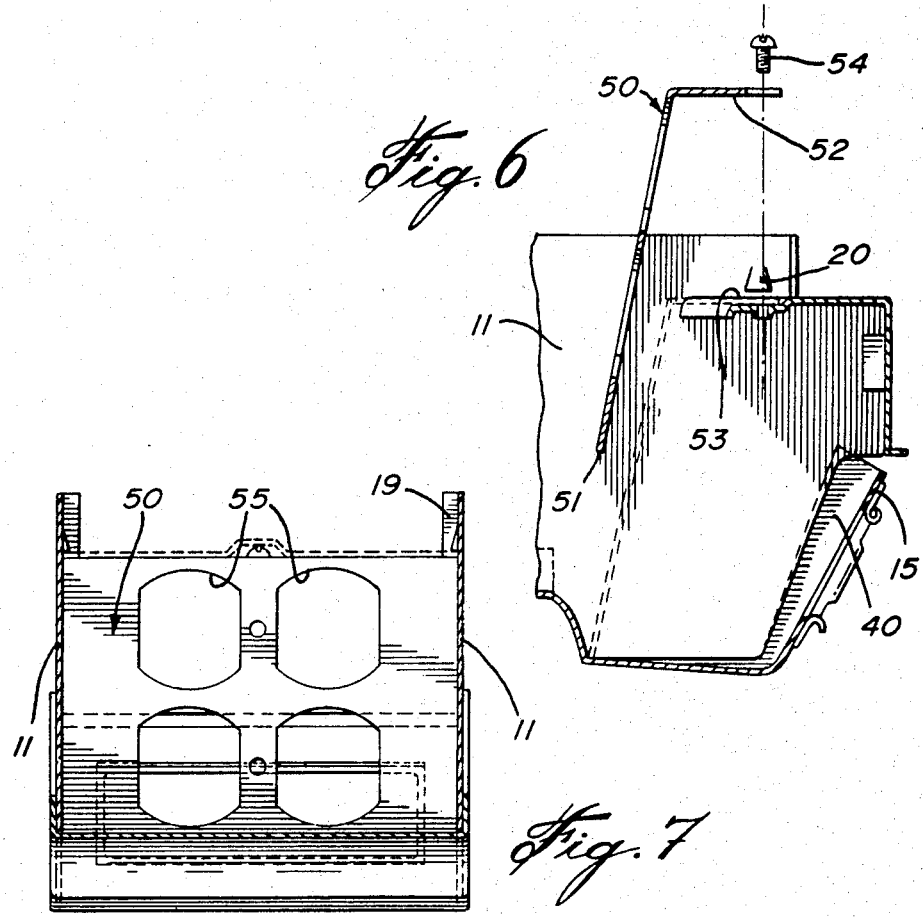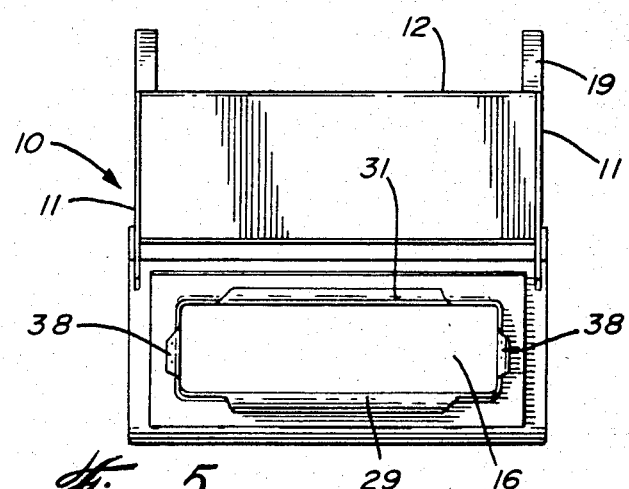

FLOOR DISTRIBUTION BOX

BACKGROUND OF THE INVENTION (a) Field of the Invention

The present invention relates to a floor distribution box which is preconstructed and which snap-fits in a channelway of a corrugated floor structure between access openings and provides communication to cells formed in the floor structure adjacent the channelway.

(b) Description of Prior Art

Various types of floor mounted distribution boxes are known such as described in U.S. Pat. No. 3,932,696 issued Jan. 13, 1976, or in U.S. Pat. No. 4,408,090 issued Oct. 4, 1983. However, prior art distribution boxes are assembled in the channelway and the channelway forms a bottom wall or side walls for the box. These boxes are constructed in registry with access openings provided in the side walls of the channelway whereby to provide access to wiring disposed in cells formed adjacent the channelway in a corrugated floor structure.

A disadvantage of such prior art floor distribution boxes is that the box needs to be assembled in the channelway, thus a time-consuming task. Also, the parts forming the box including the partition wall can be easily lost on the construction site or parts may be missing from assembly kits, thus resulting in time loss, excess labor, and often faulty or incomplete installations. If the partition wall is not installed, then it becomes dangerous during installation of wiring. These internal partition walls have knock-out apertures into which are mounted electrical receptacles or openings to receive telephone cables and must be present during installation of the box. Thus, it is preferable to have the partition wall pre-installed. Usually these partitions walls are attached inside the housing by screw fasteners which are not easily accessible from the top of the housing, making it difficult to assemble or repair.

SUMMARY OF INVENTION

It is a feature of the present invention to provide an improved floor distribution box which substantially overcomes the above-mentioned disadvantages of the prior art.

Another feature of the present invention is to provide a floor distribution box which is preconstructed and which is connected to a channelway by snap-fit retention in opposed access openings.

Another feature of the present invention is to provide a floor distribution box which is preassembled and which is provided with one or more partition walls, having knock-out apertures, which are easily removable and positionable in the box and which are preassembled in the box.

According to the above features, from a broad aspect, the present invention provides a floor distribution box adapted for securement in a channelway defined between opposed cells of a corrugated floor structure and wherein the channelway has a bottom wall and opposed outwardly inclined side walls having opposed aligned access openings therein. The floor distribution box comprises opposed bottom wall, and outwardly biased displaceable end walls secured for inward pivotal displacement. An access opening is provided in each of the end walls and has engagement means in the perimeter thereof for engagement in a respective one of the opposed access openings of a channelway. The outward bias provides a snap-fit engagement of the engagement means in the aligned access openings for retention of the box across the channelway.

BRIEF DESCRIPTION OF DRAWINGS

A preferred embodiment of the present invention will now be described with reference to the accompanying drawings in which:

FIG. 3 is a fragmented perspective view showing the floor distribution box secured in a channelway of a corrugated floor structure;

FIG. 4 is a fragmented side view showing the position of the floor distribution box when engaged in the channelway;

FIG. 5 is an end view of the floor distribution box showing the displaceable end walls;

FIG. 6 is a fragmented, partly exploded view of the floor distribution box showing the partition wall; and FIG. 7 is a front view of a partition wall.

DESCRIPTION OF PREFERRED EMBODIMENTS

Figure 1:
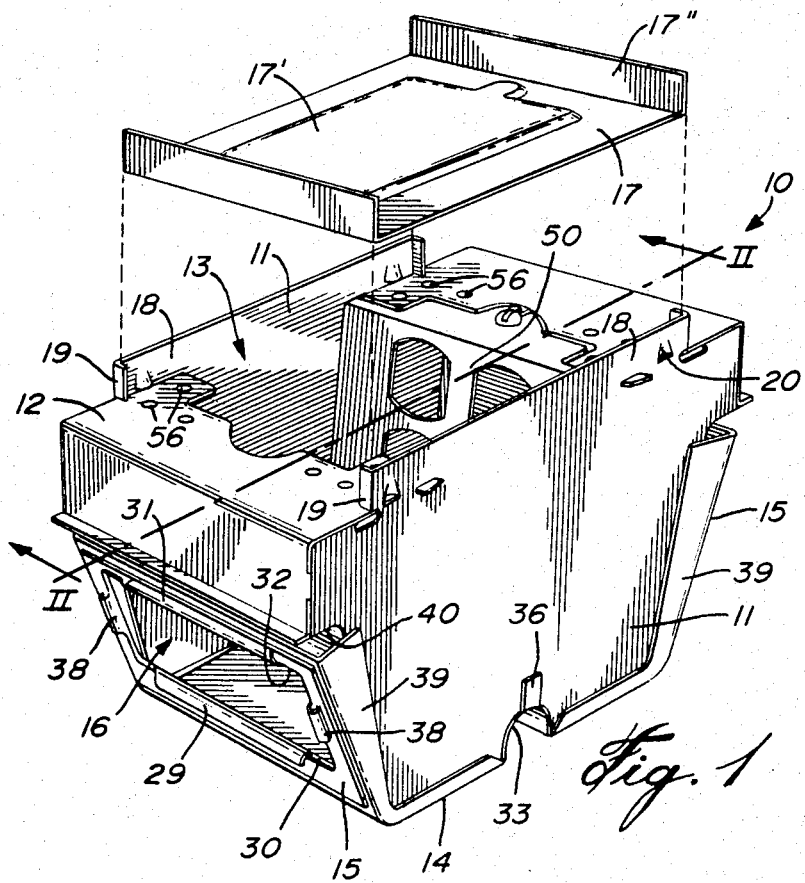
FIG. 1 is a perspective view of the floor distribution box of the present invention with the cover shown in a removed position.

Referring now to the drawings and more particularly to FIGS. 1 to 5, there is shown generally at 10 the floor distribution box of the present invention. The box is constructed as a preassembled unitary substantially sealed structure which comprises opposed transverse walls 11, a top wall 12 having an outlet opening 13, a bottom wall 14, and outwardly biased displaceable end walls 15. The displaceable end walls 15 are herein shown integrally formed with the bottom wall 14 and a side access opening 16 is provided in each of the end walls 15. A cover plate 17, having a reinforcing embossment 17' is positionable over the top wall 12 and spans the outlet opening 13 to close the opening.

As shown in FIG. 1, the transverse walls 11 are provided with a cover retention flange 18 formed in an upper edge thereof. The flanges 18 span the outlet opening 13 and have inwardly turned ends 19 and abutments 20 formed therein whereby to positionally snap-fit retain the cover 17 over the outlet opening 13. End flanges 17" of the cover 17 spans these ends 19.

Figure 2:
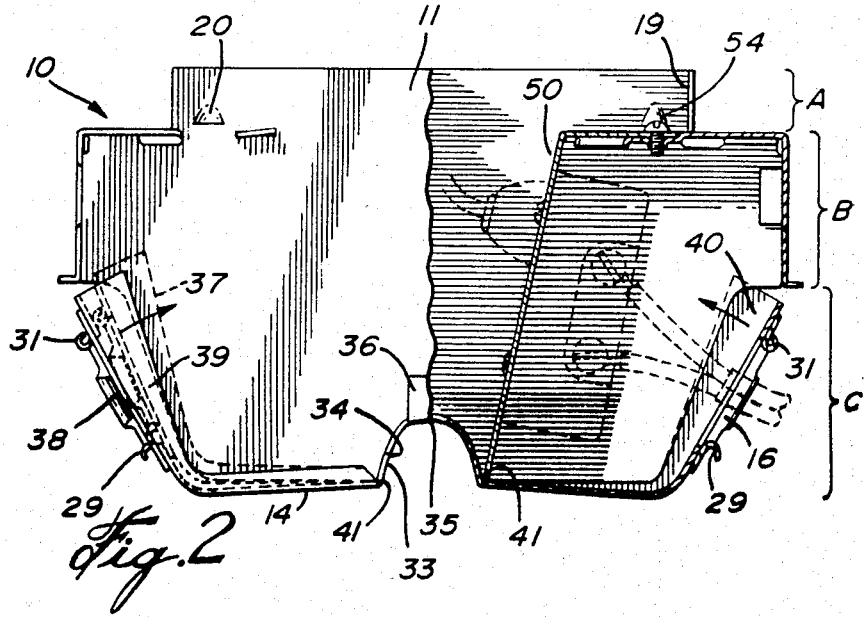
FIG. 2 is a partly fragmented side view of the floor distribution box.

As shown in FIG. 2, the distribution box 10 has three major sections, a top section A through which there is provided an access opening to the inside of the box, a channelway spanning section B which extends over a corrugated floor structure 21, as shown in FIG. 3, and a channelway locating section C which extends into the channelway.

Referring to FIG. 3, there is shown at 21 a conventional corrugated floor structure onto which concrete 22 is poured to form a floor of a building. The corrugated floor structure 21 consists of a plurality of channelways 23 formed between opposed cells 24 which are formed by a top wall 25, a bottom plate 26, and opposed side walls 28. The channelway has a bottom wall 27 and opposed outwardly inclined side walls 28 having opposed aligned access openings 29' formed therein whereby to provide access to cables extending through the cells 24.

The access openings 16 formed in the displaceable end walls 15 are each provided with engagement means in the perimeter thereof and constituted by at least an engagement flange 29 extending downwardly outwards from a lower edge 30 of the access opening and an abutment member or curled flange 31 formed in an upper edge 32. Alternatively the engagement flange 29 and the abutment member 31 may be separate elements secured adjacent the bottom and top edges, respectively, of the access opening 16, as is illustrated in the cross-section views of FIGS. 2 and 4.

As is better seen in FIG. 2, the displaceable end walls 15 are formed integral with bottom wall 14 and a bridge wall 33 extends across the opposed transverse walls 11 of the box 10. This bridge wall 33 is also formed integral with the bottom wall 14 and spans U-shaped cut-out 34 formed at the center bottom edge of the transverse walls 11. The bridge wall 33 is secured at its bottom ends 35 thereof by securing tabs 36 which may be spot-welded to the transverse wall 11. The purpose of the bridge wall 33 is to provide an outwardly biasing spring action to the opposed displaceable end walls 15, as is illustrated clearly in FIG. 2.

To secure the floor distribution box 10 in a channelway 23 all that is required to be done is to align the access openings 16 in the end walls 15 with the access openings 29' in the channelway side walls 28 and to push the box in the channel. The displaceable end walls 15 will be displaced inwardly, as shown in phantom lines at 37 in FIG. 2, until the access openings of the box and the channel are aligned. At that instant of alignment the outward biasing force, created by the inward displacement of the walls 15, will cause the end walls 15 to be displaced outwardly whereby the engagement means (flanges 29, 31 in the periphery of the access openings 16) will snap-fit within the access openings 29' of the channelway, as is shown in FIG. 4.

As shown in FIG. 1, the end edges of the rectangular openings 16 may also be provided with curled flanges 38 thus providing a smooth surface substantially along the edge of the access openings to prevent damage to cables entering the floor distribution box 10 and further to provide lateral retention with the side edges of the openings 29'.

The displaceable end walls 15 are formed with inwardly projecting flanges 39 which extend outward in close proximity to the outer surface of the housing transverse walls 11 whereby to obstruct a clearance gap 40 (better shown in FIG. 2) between the end edge portions of the transverse walls 11 and the inner face of the displaceable end walls 15. This flange is necessary to obstruct this clearance gap so that concrete does not flow into the housing when it is poured thereover. This flange also stiffens the bottom wall 14 and end walls 15 whereby to achieve stronger spring action.

It can be seen that the bridge wall 33 divides the bottom wall 14 into two sections whereby each of the displaceable end walls are pivotally displaced substantially along a V-joint 41 formed at the juncture of the bottom wall sections 14 and the bridge wall. The opposed transverse walls 11 are dimensioned such that the box bottom wall 14 is supported elevated from the channelway bottom wall 27, as is clearly shown in FIGS. 3 and 4. This permits ease of adjustment or alignment of the box in the channelway whereby to align the access openings for quick snap-fit attachment of the box within the channelway. The fact that the bottom wall 14 of the housing is spaced from the bottom wall 27 of the channelway permits concrete to flow under the box to provide a stronger floor and better insulation of the box.

Referring now to FIGS. 6 and 7, one or two partition plates 50 are secured in the box and retained captive at their lower edge 51 in the V-joint 41 internally of the box, and at a top end by an attachment flange 52. The top wall 12 of the box is formed with a recessed flange attachment edge 53 which is burr free and which is spaced rearwardly of the V-joint 41, as viewed in a vertical plane, whereby to retain the partition plate 50 angulated between the V-joint 41 and the flange attachment edge 53. A single screw fastener 54 is provided to secure the top attachment flange 52 to the recessed attachment edge 53. Thus, the partition wall 50 is easily removable and positionable within the box by a single top screw fastener.

As shown in FIG. 7, the partition wall 50 is provided with receptacle knock-out openings 55 whereby to receive electrical receptacles therein (shown in phantom lines in FIG. 2) to provide electrical connections through the floor distribution box. The opposed side of the opening 13 is usually not provided with a partition wall and is used for the passage of telephone cables and connector.

It can be seen that with the floor distribution box of the present invention, it is not necessary to assemble any parts of the box on the construction site. The box is quickly and easily snap-fitted into engagement in the channelways. Also, it is not necessary to have any special tools for this assembly as it is an easy manual operation not requiring qualified technicians to make the installation. After installation concrete 22 is poured over the distribution box 10, as shown in FIG. 3, and entirely over the top wall and cover 17. These boxes are provided along the channelway at spaced apart locations and all that is necessary to do when an electrical distribution box requires access thereto is to chip away the concrete about the closure 17 whereby to remove same and provide access to the interior of the box. A special type cover plate or frame (not shown) is then secured over the outlet opening and attached to the holes 56 provided in the top wall 12.

It is within the ambit of the present invention to cover any obvious modifications of the example of the preferred embodiment described herein, provided such modifications fall within the scope of the appended claims.

I claim:

1. A floor distribution box adapted for securement in a channelway defined between opposed cells of corrugated floor structure and wherein said channelway has a bottom wall and opposed outwardly inclined side walls having opposed aligned access openings therein; said box comprising opposed transverse walls, a top wall having an outlet opening, a bottom wall, and outwardly biased displaceable end walls secured for inward pivotal displacement; an access opening in each said end walls and having engagement means in the perimeter thereof for engagement in a respective one of said opposed access openings of a channelway, said outward bias providing snap-fit engagement of said engagement means in said aligned access openings for retention of said box across said channelway.

2. A floor distribution box as claimed in claim 1 wherein said box bottom wall and said displaceable end walls are integrally formed.

3. A floor distribution box as claimed in claim 2 wherein said bottom wall has a center inwardly extending bridge wall secured at a trough portion thereof to said opposed transverse walls of said box to provide an outwardly biasing spring action to said opposed displaceable end walls to obtain said snap-fit retention.

4. A floor distribution box as claimed in claim 2 wherein said box bottom wall and said displaceable end walls have inwardly projecting flanges to obstruct a clearance gap between edge portions of said box transverse walls and said displaceable end walls and to strengthen the spring action of said displaceable end walls.

5. A floor distribution box as claimed in claim 4 wherein said flanges are disposed outwardly and in close proximity to said box transverse walls; said flanges decreasing in width from a top free end of said displaceable end walls to said bridge wall.

6. A floor distribution box as claimed in claim 2 wherein said engagement means comprises an engagement flange extending downwardly outwards from a lower edge of said access opening in said box end walls, and an abutment member in an upper edge of said access opening.

7. A floor distribution box as claimed in claim 6 wherein said abutment member is an elongated outwardly turned bead formed in said upper edge of said access opening.

8. A floor distribution box as claimed in claim 6 wherein said access openings in said channel side walls and said box end walls are rectangular shaped openings.

9. A floor distribution box as claimed in claim 8 wherein said abutment member is an elongated outwardly turned bead formed in a straight upper edge of said end walls access opening, and a further outwardly turned bead in each of opposed straight end edges of said end walls access opening.

10. A floor distribution box as claimed in claim 3 wherein said bridge wall is of inverted U-shape cross-section and secured to said opposed transverse walls by retention tabs formed at the ends thereof at said trough portion, said bridge wall dividing said bottom wall in two sections, each said displaceable end walls pivoting substantially from a V-joint formed at the juncture of its respective bottom wall section and said bridge wall.

11. A floor distribution box as claimed in claim 3 wherein said box opposed transverse walls are dimensioned such that said box bottom wall is supported elevated from said channelway bottom wall when in snap-fit engagement thereacross.

12. A floor distribution box as claimed in claim 3 wherein said bridge wall divides said bottom wall in two sections, a V-joint formed at the juncture of said bridge wall with each bottom wall section, and a partition plate securable in said box and retained captive between said V-joint and a top attachment in said box top wall.

13. A floor distribution box as claimed in claim 12 wherein said partition plate has a straight bottom edge, and a top attachment flange formed in an upper edge thereof, a flange attachment edge in said box top wall spaced above a respective bottom wall section and spaced rearwardly of said V-joint to retain said partition plate angulated between said V-joint and said flange attachment edge.

14. A floor distribution box as claimed in claim 13 wherein said flange attachment edge is a recessed edge portion configured to receive said top attachment flange in flush seating engagement thereover to provide a smooth box top wall.

15. A floor distribution box as claimed in claim 13 wherein said partition is retained in position by a single screw fastener securing said top attachment flange to said flange attachment edge of said box top wall.

16. A floor distribution box as claimed in claim 15 wherein said partition wall is provided with receptacle openings.

17. A floor distribution box as claimed in claim 1 wherein said opposed transverse walls of said box have a cover retention flange formed in an upper edge thereof, said flanges spanning said outlet opening in said top wall, a cover retained between said cover retention flange and obstructing said outlet opening.

18. A floor distribution box as claimed in claim 17 wherein said cover is removably secured to said cover retention flanges by abutments formed in said flanges.

19. A floor distribution box adapted for securement in a channelway defined between opposed cells of a corrugated floor structure, said channelway having a bottom wall and opposed side walls with access openings therein, said box comprising opposed transverse walls, a top wall having an outlet opening, a bottom wall, and end walls having access openings therein for registry with said access openings in said channelway side walls, at least one transverse joint formed in said box bottom wall adjacent the center thereof, a partition plate securable in said box and retained captive between said transverse joint and a top attachment in said box top wall by a single screw fastener in said top attachment.

20. A floor distribution box as claimed in claim 19 where a bridge wall divides said bottom wall in two sections, a V-joint formed at the juncture of said bridge wall and said bottom wall on each side of said bridge wall, said V-joint constituting said transverse joint.

21. A floor distribution box as claimed in claim 20 wherein said partition plate has a straight bottom edge, and a top attachment flange formed in an upper edge thereof, a flange attachment edge in said box top wall spaced above a respective bottom wall section and spaced rearwardly of said V-joint to retain said partition plate angulated between said V-joint and said flange attachment edge.

22. A floor distribution box as claimed in claim 20 whrein said flange attachment edge is a recessed edge portion configured to receive said top attachment flange in flush seating engagement thereover to provide a smooth box top wall.

23. A floor distribution box as claimed in claim 22 wherein said opposed transverse walls of said box have a cover retention flange formed in an upper edge thereof, said flanges spanning said outlet opening in said top wall, a cover retained between said cover retention flange and obstructing said outlet opening.

24. A floor distribution box as claimed in claim 23 wherein said cover is removably secured to said cover retention flanges by abutments formed in said flanges.

25. A floor distribution box as claimed in claim 24 wherein said partition wall is provided with receptacle openings.

* * * * *